[11] 3,617,927
[45] Patented Nov. 2, 1971
331/94.5

[72] Inventor Dieter Pohl
No. 5b, Otztalerstrasse, Munich 23, Germany
[21] Appl. No. 699,260
[22] Filed Jan. 19, 1968
[45] Patented Nov. 2, 1971
[32] Priority Jan. 31, 1967
[33] Germany
[31] P 41324

[54] ARRANGEMENT FOR CONTROLLING THE Q-FACTOR OF A RESONATOR OF AN OPTICAL EMITTER OF COHERENT ELECTROMAGNETIC RADIATION, FOR THE PURPOSE OF GENERATING GIANT PULSES
9 Claims, 4 Drawing Figs.

[52] U.S. Cl. .................................................. 331/94.5, 350/160
[51] Int. Cl. .................................................. H01s 3/11
[50] Field of Search .......................................... 331/94.5; 350/160

[56] References Cited
UNITED STATES PATENTS
3,365,678  1/1968  Maurer ........................ 331/94.5

OTHER REFERENCES
Ambartsumyan et al., A Laser with a Nonresonant Feedback. IEEE J. Quant. Elect. VQE–2, No. 9 (Sept. 1966) pp. 442– 446 1967) pp.42–
Alcock et al., Multiple Stimulated Brillouin Scattering From A Liquid Within A Laser Cavity. Appl. Phys. Letter, Vol. 11, No. 2 (July 15, 1967) pp. 42– 44

*Primary Examiner*— William L. Sikes
*Attorney*— Markva & Smith

ABSTRACT: An arrangement for controlling the Q-factor of a resonator of an optical emitter of coherent electromagnetic radiation is provided which consists of a body serving as Q-control member located in a line with and at the same end of an active amplifying medium as at least one partial reflector which end is opposite the end at which a totally reflecting prism is located. The body is capable of being excited to stimulated Brillouin scatter and is arranged such that the scattered radiation is coupled back into said active amplifying medium. There may be one or several partial reflectors located at the end of the body remote from the active amplifying medium and between the body and this medium, respectively. A collecting lens may be arranged between the body and the active amplifying medium, and another such lens may be located adjacent the end of the body remote from the active amplifying member. A semitransparent obliquely placed mirror may be provided between the totally reflecting prism and the body.

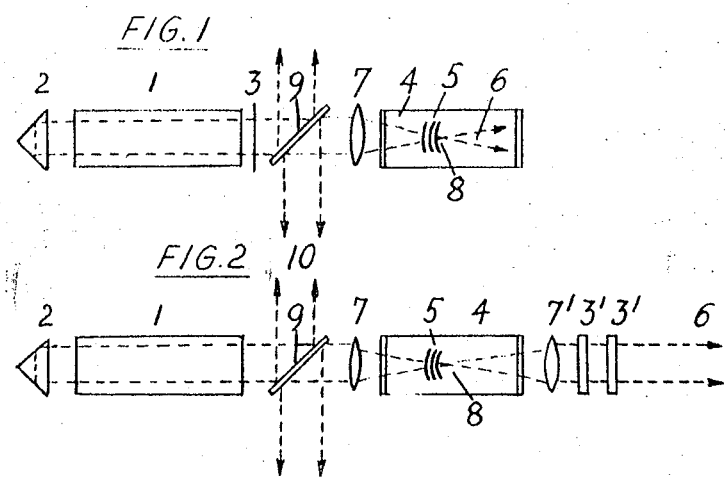
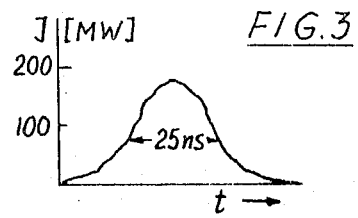
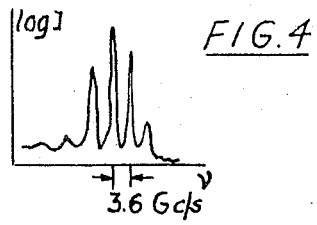

ARRANGEMENT FOR CONTROLLING THE Q-FACTOR OF A RESONATOR OF AN OPTICAL EMITTER OF COHERENT ELECTROMAGNETIC RADIATION, FOR THE PURPOSE OF GENERATING GIANT PULSES

BACKGROUND OF THE INVENTION

This invention relates to an arrangement for controlling the factor of merit or Q-factor of the resonator in an optical emitter of coherent electromagnetic radiation, which comprises at each end of an active amplifying medium a reflector as well as at one end thereof a control member for the purpose of stimulating the emission of giant pulses.

Arrangements of such a kind are already known which comprise a ruby rod as the active medium and a mirror at each end of the ruby rod, and in which either:

a. a Kerr cell is interposed between one of the mirrors and the ruby rod,
 b. one of the mirrors is a rotating mirror, or
 c. a saturable absorber is provided between one of the mirrors and the ruby rod.

Arrangements according to either (a) or (b) have the drawback that complicated and very precisely functioning control means must be associated with the Kerr cell or with the rotary mirror in order to raise the Q-factor at an extremely high rate at a given instant. The arrangement according to (b) has the further drawback that the requirement of a very rapid rise is extremely difficult to fulfill. Although the arrangement according to (c) is structurally very much simpler, it is open to the objection that the saturable absorber is frequency-dependent and that it can therefore be used only for a particular frequency of emission. Each specific frequency calls for the provision of a different absorber. Moreover, only very few such absorbers are actually available.

SUMMARY OF THE INVENTION

It is therefore the object of the present invention to overcome the above-mentioned drawbacks and to provide an arrangement of the type mentioned above which permits the maximum possible intensity of emission (giant pulses) to be achieved with any optical emitter.

To attain this object, the present invention provides an arrangement for controlling the Q-factor of a resonator of an optical emitter of coherent electromagnetic radiation, for the purpose of generating giant pulses, which comprises an active amplifying medium; a totally reflecting prism located at one end of said active amplifying medium; at least one partial reflector located at the opposite end of said active amplifying medium; and a body serving as a Q-control member and located in a line with and at the same end of said active amplifying medium as said partial reflector, which body is capable of being excited to stimulated Brillouin scatter and is arranged such that the scattered radiation is coupled back into said active amplifying medium.

A feature of the arrangement proposed by the invention is its simplicity of construction and in this respect it equals the arrangement according to (c), but contrary to the latter it is generally applicable to any frequency, both in the visible and in the invisible ranges, since the entire frequency range that is of practical interest can be covered.

It may be preferred in one partial reflector is located between and in line with the body and the active amplifying medium, that is, in front of said body seen in the direction of radiation.

On the other hand, it may be desirable if the partial reflector is located in line with and beyond the body at the end of the body remote from the active amplifying medium, that is, behind said body seen in the direction of radiation.

Another useful development of the proposed arrangement in which a partial reflector is in front of said body, is the provision in a conventional manner of a collecting lens between the active medium and said body in such a way that the focus of the lens is inside said body. The known advantage afforded by such a collecting lens is that it increases the radiation density in the focal point inside said body. Stimulated Brillouin scatter can thus be triggered when the incident radiation intensity is not yet very high. Arrangements including collecting lenses that are provided with means for controlling the Q-factor of the optical resonator have already been used in optical emitters for stimulated radiation. The collecting lens may be disposed between the partial reflector and said body.

In an embodiment of the invention in which a partial reflector is located behind said body seen in the direction of radiation, it is preferred if a collecting lens is disposed between the active amplifying medium and the body and a second collecting lens is disposed at the opposite end of said body, said second collecting lens being arranged directly opposite said body. Arrangements of the latter kind have also already been proposed in optical emitters for stimulated radiation of the above-mentioned kind.

Furthermore, in embodiments of the invention comprising a partial reflector behind said body seen in the direction of radiation and possibly also two collecting lenses, it may further be useful to replace said single partial reflector by two such reflectors.

Moreover, in an embodiment of the invention comprising a high reflectance reflector, in this case a totally reflecting prism, at the other end of the emitter one of the partial reflectors may likewise be located at this end.

The advantage afforded by these two latter arrangements is that the combination of the two reflectors constitutes a fresh composite reflector whose reflectance is highly dependent on frequency. By suitably spacing the two partial reflectors or the two reflectors at the opposite end the only frequencies generated by the optical emitter will differ by the frequency difference of Brillouin scatter. This results in the stimulated Brillouin scatter being triggered by an incident radiation of even lower intensity.

Finally, according to another useful feature of the invention, a semitransparent obliquely placed mirror may be located between the high-reflectance reflector at the other end of said body and said body. The presence of such a mirror permits the emitted light to be optimally adapted to the requirements of any particular case.

BRIEF DESCRIPTION OF THE DRAWING

Several embodiments of the invention will now be described by way of example and with reference to the accompanying drawing, in which:

FIG. 1 is a schematic representation of a first embodiment of an arrangement according to the invention;

FIG. 2 is a similar representation of a second embodiment of the arrangement;

FIG. 3 is a graph showing the development of a giant pulse, and

FIG. 4 is a graph showing the frequency spectrum of said giant pulse.

DESCRIPTION OF THE PREFERRED EMBODIMENTS

FIG. 1 shows an optical emitter which contains an active amplifying medium 1, for instance in the form of a ruby rod, between a totally reflecting prism 2 and a partial reflector 3. When the active medium 1 is appropriately excited a normal optical oscillation will build up in this system. A pencil of light leaves this system through the partial reflector 3, and after having passed through a semitransparent obliquely placed mirror 9 the parallel rays in the beam are focused within a body 4, by a collecting lens 7, which body 4 can be excited to stimulated Brillouin scatter (SBS). This body 4 may have the form of a cell provided with optical windows and filled with carbon disulfide. When the incident light emitted by the said system exceeds a given intensity threshold, hypersonic waves 5 will build up around the focus 8 and reflect the major proportion of the incident light in the direction of incidence. Upon passing through the active medium 1, the reflected light is further amplified, reflected by the prism 2, again amplified in the active medium 1 and impinges again on the body 4 in the direction of the original incident beam. It is again reflected in the body 4. This arrangement constantly builds up the intensity of the light between the prism 2 and the body 4 until the entire available energy stored in the active medium 1 is converted into light. This buildup takes about $2 \cdot 10^{18}$ seconds to complete and the light flux 6 leaving the emitter might attain a peak intensity of several hundred megawatts (giant pulse). The light flux 6 leaves the emitter through the body 4 which retains a low transmittance even during the process of SBS, and in the illustrated arrangement the light also passes through the semitransparent obliquely placed mirror 9. By varying the reflectance of this mirror 9 the path and intensity of the giant pulse can be optimally adapted to the purpose in view.

FIG. 3 is a graph illustrating the buildup and decay of the giant pulse as a function of time.

FIG. 4 is a graph representing the frequency spectrum of the giant pulse thus produced. It comprises a plurality of maxima at frequency intervals of 3.6 Gc/s corresponding to the frequency shifts during SBS in the carbon disulfide. The entire frequency range traversed by the optical emitter in giant pulse operation in the illustrated example is about 18 Gc/s, a very narrow range compared with that of giant pulses achieved in known arrangements using a Kerr cell or a rotating mirror.

In the arrangement illustrated in FIG. 2 the partial reflector 3 preceding the body 4 in the direction of radiation is replaced by two partial reflectors 3' and a second collecting lens 7' located behind the body 4. The effect of this combination of two partial reflectors 3' is that the optical emitter will emit light confined to frequencies differing by a prescribed frequency interval. This difference is determined by the spacing of the two partial reflectors 3' which is preferably so chosen that the said frequency difference equals the frequency difference between the incident light and the back reflected light after Brillouin scatter. If a wider spacing is required, one of the partial reflectors 3' can be placed between the totally reflecting prism 2 and the body 4, this arrangement is not shown in the drawing. In such arrangements the threshold intensity for triggering the stimulated Brillouin scatter in the body 4 is particularly low, so that the resultant operating conditions are extremely good. In such an arrangement hypersonic waves 5 are already induced in the body 4 before the threshold intensity for SBS has actually been reached, a circumstance which favors the development of SBS and creates especially stable operating conditions.

In arrangements as proposed by the invention for the generation of giant pulses in optical emitters the light emitted by a normal optical emitter stimulates a body 4 to Brillouin scatter, the scattered light being back reflected into the active medium 1. The direction of scatter is precisely contrary to the direction of incidence, and the major proportion ($\geq 90$ percent) of the incident light is converted into reflected Brillouin light. The Q-factor of the resonator of the optical emitter is thus improved and a giant pulse is built up. However, the incident intensity must first attain the critical threshold intensity to induce SBS and this can be readily achieved by focusing, provided a highly amplifying active medium 1 and suitable bodies 4 are used.

Giant pulses can be generated for instance with the aid of a ruby rod (0.7 cms. diameter $\times$ 15 cms. length) or with a neodymium glass rod (1.4 cms. diameter $\times$ 18 cms. length Schott LG 55 ) (FIG. 1). The active medium 1 faces the collecting lens 7 ($f$=5 cm.) and a body 4 (length 15 cm.) filled with $CS_2$. In this arrangement the peak intensity in normal operation is 15 to 20 kW, SBS beginning at about 10 kW. The giant pulse substantially defines a Gaussian distribution with a peak intensity of $\geq 100$ MW and a full width at half maximum intensity of $\approx 25$ ns (FIG. 3). The spectrum, shape and intensity of the giant pulse can be calculated from the energy balancing equations for inversion and for photons associated with the several energy levels $m$. The frequency shift $\Delta k_{SBS} = -k \cdot v/c$ between the incident and scattered light is taken into account by a natural frequency conversion term ($k$ = wave number of the light from the optical emitter, $v$ = speed of sound, $c$ = speed of light). For $CS_2$ and $\lambda$=1.06 $\mu$m. (Nd emitter), $\Delta k_{SBS}$=cm.$^{11}$). This shift is small in relation to the amplification line width and leads to the buildup of a series of separate pulses overlapping in time and differing in wave number by $\Delta K_{SBS}$.

The photon flux is determined by:

$$p_m(t) = \text{const} \cdot \exp -(t/t_H)^2 \cdot (t/t_{SBS})^{m/}_m \quad (1)$$

($t_H$=pulse width at half peak value,
$t_{SBS}$=conversion factor).

Integration of equation (1) yields a spectral energy distribution which can be experimentally check by a Fabry-Perot spectrograph (FIG. 4). FIG. 2 is a modification of the arrangement according to FIG. 1. The resonator here contains a resonance reflector consisting of two partial reflectors 3' which generate natural oscillations differing in wave number by $\Delta k_{RR}$. Each natural oscillation comprises tow contradirectional waves. As in the arrangement according to FIG. 1, the wave $k_o$ which runs from the active medium 1 into the body 4 is converted by SBS but it amplifies an already existing contradirectional wave $-(k_o-\Delta k_{SBS})$ provided the condition $\Delta k_{RR}=\Delta k_{SBS}$ is satisfied. The converted beam is not therefore built up on the background of normal Brillouin scatter, as in FIG. 1. Improved reproducibility as well as a reduced intensity threshold are the result. It can be confirmed experimentally that giant pulses cannot be generated unless the reflectors 3' are tuned to $\Delta k_{SBS}$. The maximum deviation at which giant pulses will still appear roughly corresponds to the phonon line width ($CS_2$: $\approx 2 \cdot 10^{13}$cm.$^{11}$[3]). In principle, phonon lives can thus be determined because the back-refelected light will be amplified only if the forced (photo-) elastic wave is permanently in phase with the free wave.

The described arrangement is simple, easy to adjust and suitable for controlling the Q-factor of optical high output emitters within a wide frequency range. Particularly important is its applicability to the infrared region, since in this range the otherwise so convenient saturable dyes are usually unstable. The spectrum of the SBS giant pulse always consists of several frequencies. The major proportion of the intensity is concentrated within only a few neighboring frequencies (cf. FIG. 4).

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An arrangement for controlling the Q-factor of a resonator of an optical emitter of coherent electromagnetic radiation, for the purpose of generating giant pulses, comprising:
   a. an active amplifying medium;
   b. a totally reflecting prism located at one end of said active amplifying medium;
   c. at least one partial reflector located at the opposite end of said active amplifying medium; and
   d. a body, capable of being stimulated to Brillouin scattering, serving as a Q-control member and located in a line with and at the same end of said active amplifying medium as said partial reflector, which body is excited to stimulated Brillouin scatter and is arranged such that the scattered radiation is coupled back into said active amplifying medium.

2. An arrangement as claimed in claim 1, wherein the partial reflector is located between and in line with the body and the active amplifying medium.

3. An arrangement as claimed in claim 1, wherein said at least one partial reflector is located in line with and beyond the body at the end of the body remote from the active amplifying medium.

4. An arrangement as claimed in claim 2, wherein a collecting lens is provided between the active amplifying medium and the body, so disposed that its focus is within said body.

5. An arrangement as claimed in claim 4, wherein the collecting lens is located between the partial reflector and the body.

6. An arrangement as claimed in claim 3, wherein two partial reflectors are located in line with and beyond the body at the end of the body remote from the active amplifying medium and a collecting lens is disposed between the active amplifying medium and the body and a second collecting lens is disposed at the opposite end of said body between said body and said partial reflector, said second collecting lens being arranged directly opposite said body whereby said two lens together with with the two mirrors form an optical resonator which strongly concentrates the light field in said body.

7. An arrangement as claimed in claim 3, wherein two partial reflectors are provided in line with and beyond the body on the side of the body remote from the active amplifying medium.

8. An arrangement as claimed in claim 3, comprising a plurality of said partial reflectors and wherein one of the partial reflectors is located at the same end of the arrangement as the totally reflecting prism.

9. An arrangement as claimed in claim 1, wherein a semitransparent obliquely placed mirror is provided between the totally reflecting prism and the body.

* * * * *